Patented Mar. 19, 1929.

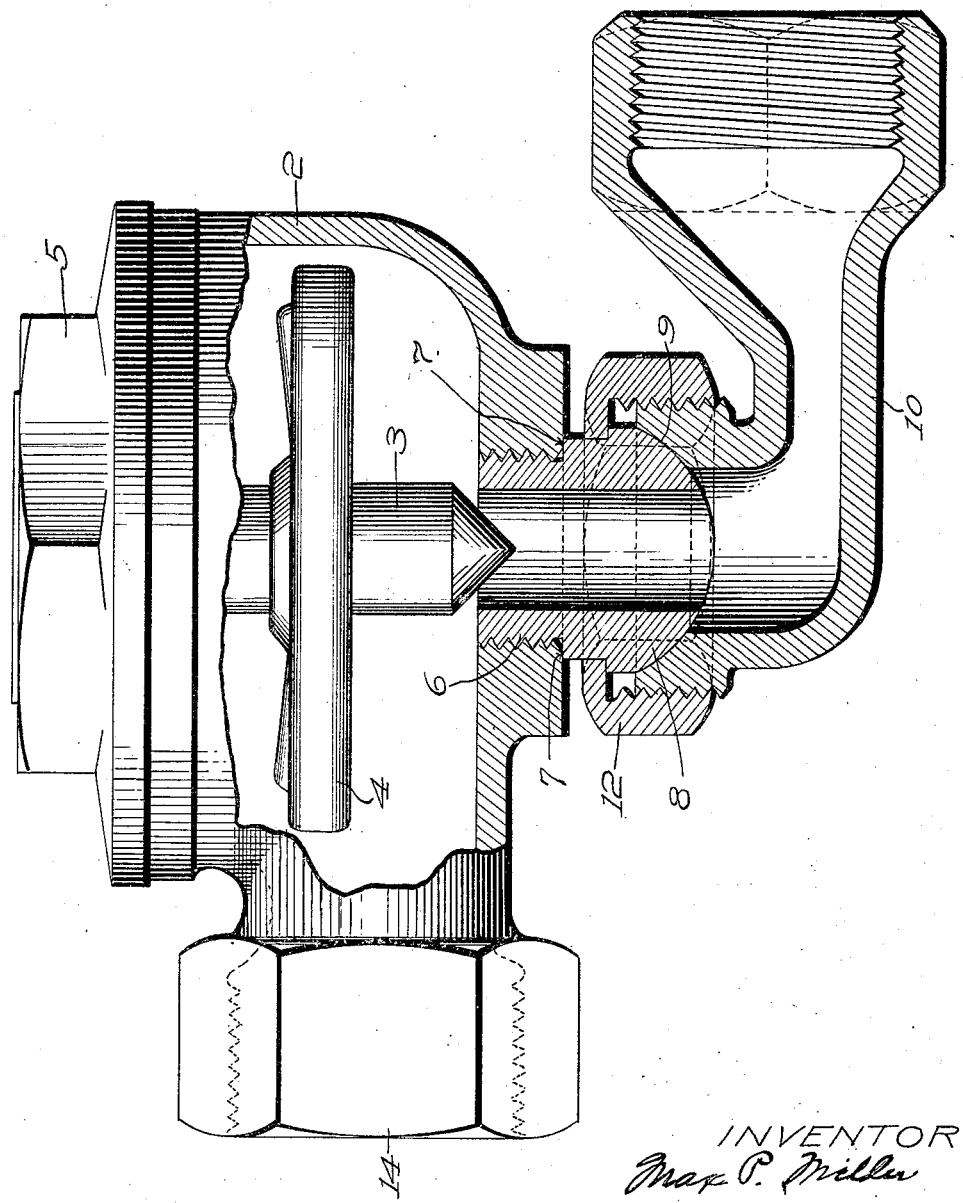

1,705,642

UNITED STATES PATENT OFFICE.

MAX PAUL MILLER, OF WABAN, MASSACHUSETTS, ASSIGNOR TO W. D. CASHIN CO., OF BOSTON, MASSACHUSETTS, A CORPORATION OF MASSACHUSETTS.

STEAM TRAP AND VALVE.

Application filed May 8, 1925. Serial No. 28,853.

This invention relates to automatic steam traps of the type used to control the discharge of water from steam radiators and to radiator supply valves.

At the present time the bodies of steam traps of the type mentioned are made in rights, lefts, or straights, depending upon the direction at which the outlet leaves the body with reference to the inlet. These styles are necessary because the trap must ordinarily be located so close to the floor that there is not sufficient room to make pipe connections below it. The fact that it is necessary to have these different styles of bodies is objectionable not only in increasing the manufacturing cost, but it is also a cause of annoyance and expense in the installation of radiators and the connection of the piping to them. The same objections apply to the inlet or supply valves for radiators. It is the chief object of the present invention therefore to devise a construction which will eliminate the necessity for using the different styles of bodies that have been required heretofore.

The nature of the invention will be readily understood from the following description when read in connection with the accompanying drawings, and the novel features will be particularly pointed out in the appended claims.

The single figure of the accompanying drawing is a view, partly in side elevation and partly in vertical cross-section, illustrating a construction embodying the present invention.

The steam trap shown in the drawings comprises a body 2 having an inlet opening into the side thereof and an outlet in its bottom. Mounted within this body is a valve plunger 3 which is supported and operated by a bellows thermostat 4. This thermostat may be of the usual construction employed in traps of this type, and it may be mounted in the body 2 in any usual or suitable manner. A cap 5 closes the top of the body.

The bottom of the body 2 is drilled and tapped to receive the threaded nipple 6 of the male member of a swivel union. This member is provided with a shoulder 7 to abut against the lower face of the body 2, and it has a head 8 of the usual form to fit in a seat 9 in the female L-shaped member 10 of the union. The two parts of the union are secured together by a nut 12.

Instead of providing a separate seat for the plunger 3 within the body of the trap, the upper end of the nipple 6 preferably is arranged to form the seat for this plunger, this nipple being made to project the proper distance beyond the shoulder 7 for this purpose. The part 10 of the union can be swung into any desired angular relationship to the inlet end 14 and secured thereto, so that this trap can be used in any location where a right, left, or straight body otherwise would be required. At the same time the arrangement is such that the distance between the bottom of the trap and the lower side of the enlarged part of the union member 10 is only very slightly greater than that of the usual designs of trap bodies. This trap, therefore, can be used in substantially any space where the ordinary right, left, or straight trap could be used. At the same time it has the advantage of eliminating the necessity for manufacturing and carrying in stock three different styles of trap bodies, and eliminates the confusion which always arises in making installations due to mistakes in ordering or delivering the proper number of rights, lefts, or straights for the particular job in hand.

It will be observed that the short upright portion of the L-shaped member 10 of the union lies entirely within the vertical dimensions of the laterally extending shank portion of this member, the total length of the short upright section being less than the maximum width of the right-hand end of the shank. This construction is of advantage in reducing the extreme outside dimensions of the space required for the trap and its pipe connection. Even when standard sizes of trap bodies and nuts are used, the distance between the center of the inlet and the lower side of the union 10 is only a very small fraction of an inch greater than that of the usual designs of trap bodies and such dimensions can be further reduced if found necessary.

Essentially the same construction is used for an inlet or supply valve, the nipple 6, however, preferably being extended into the body of the valve, but forming a seat for the valve plunger. Any usual or suitable mechanism for operating this plunger may be employed, as will be appreciated by those skilled in this art.

Inasmuch as a steam trap is essentially a valve and the invention is also applicable to the inlet or supply valves, as above stated, the term "valve" will be used in the claims to designate either a trap or a valve.

Having thus described my invention, what I desire to claim as new is:

1. A valve of the character described comprising a valve body having an inlet in one side thereof and an outlet in the bottom thereof, a valve plunger in said body, means for operating said plunger, a part having a head forming one member of a swivel union, said part including a nipple threaded into the bottom of said body with the upper end of said nipple forming a seat for said plunger, a shoulder on said part bearing against the lower side of said body, said head being located immediately beside said body, an L-shaped union member including an upright part having a seat to fit against said head and to swivel thereon and a shank extending laterally from said upright part, and a nut for securing the upright part of said union to said head.

2. A valve of the character described comprising a valve body having an aperture in the bottom thereof, a valve plunger in said body, means for operating said plunger, a part forming one member of a swivel union and comprising a nipple threaded into said aperture and a head from which said nipple projects, said head being located immediately beside said body, an L-shaped union member including an upright part having a seat to fit against said head and to swivel thereon and a shank extending laterally away from said upright part and threaded to receive a pipe connection, said upright part of said L-shaped union member being located within the vertical dimensions of the shank portion of said member, and a nut for securing the upright part of said union member to said head.

3. A valve of the character described comprising a valve body having an aperture in the wall thereof, a valve plunger in said body, means for operating said plunger, a part forming one member of a swivel union and having a nipple threaded into said aperture with its inner end forming a seat for said plunger, said part including a head from which said nipple projects and a shoulder bearing against the outer side of said body with said head located immediately beside said body, an L-shaped union member including a shank portion and a short connecting portion extending at right angles to said shank and having a seat to fit against said head and to swivel on said head, the length of said short portion of said L-shaped union member being less than the maximum width of said shank portion, and a nut for securing the two parts of said union together with said head fitting against said seat.

MAX PAUL MILLER.